United States Patent
Hamada

(10) Patent No.: US 8,015,164 B2
(45) Date of Patent: Sep. 6, 2011

(54) INFORMATION PROCESSING APPARATUS AND INFORMATION PROCESSING METHOD

(75) Inventor: Yoshinobu Hamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 11/610,751

(22) Filed: Dec. 14, 2006

(65) Prior Publication Data

US 2007/0150475 A1 Jun. 28, 2007

(30) Foreign Application Priority Data

Dec. 22, 2005 (JP) ................................. 2005-370895

(51) Int. Cl.
*G06F 17/00* (2006.01)
*G06F 15/16* (2006.01)

(52) U.S. Cl. ......... 707/694; 707/821; 715/741; 709/204

(58) Field of Classification Search ............... 707/104.1, 707/200, 694, 821, 999.101, 999.107, 999.2; 709/204; 715/741
See application file for complete search history.

(56) References Cited

U.S. PATENT DOCUMENTS

| | | | | |
|---|---|---|---|---|
| 7,219,234 | B1* | 5/2007 | Ashland et al. | 713/182 |
| 2003/0023587 | A1* | 1/2003 | Dennis et al. | 707/3 |
| 2003/0115326 | A1* | 6/2003 | Verma et al. | 709/225 |
| 2003/0120601 | A1* | 6/2003 | Ouye et al. | 705/51 |
| 2003/0217034 | A1* | 11/2003 | Shutt | 707/1 |
| 2004/0021686 | A1* | 2/2004 | Barberis | 345/738 |
| 2004/0193717 | A1* | 9/2004 | Tajima et al. | 709/228 |
| 2005/0044145 | A1* | 2/2005 | Quinn et al. | 709/205 |
| 2005/0198329 | A1* | 9/2005 | Byrd et al. | 709/229 |
| 2005/0251508 | A1* | 11/2005 | Shimizu | 707/2 |
| 2006/0026502 | A1* | 2/2006 | Dutta | 715/511 |
| 2006/0053380 | A1* | 3/2006 | Spataro et al. | 715/753 |
| 2007/0005595 | A1* | 1/2007 | Gafter | 707/6 |
| 2007/0016583 | A1* | 1/2007 | Lempel et al. | 707/9 |

FOREIGN PATENT DOCUMENTS

| | | |
|---|---|---|
| JP | 2003-280990 | 10/2003 |
| JP | 2005-031834 A | 2/2005 |
| JP | 2005-038393 A | 2/2005 |
| JP | 2005-285008 A | 10/2005 |

OTHER PUBLICATIONS

Greg Harvey; "Adobe Acrobat 6 PDF for Dummies"; 2003; Wiley Publishing, Inc.; p. 239-244.*
Office Action for corresponding Japanese Patent Application No. 2005-370895 issued Jul. 4, 2011.

* cited by examiner

*Primary Examiner* — Tony Mahmoudi
*Assistant Examiner* — Dennis Truong
(74) *Attorney, Agent, or Firm* — Fitzpatrick, Cella, Harper & Scinto

(57) ABSTRACT

An object of this invention is to allow a user to easily confirm whether the access right is set within a desired range in a system which can set the access right. To achieve the object, according to this invention, an information processing apparatus includes a unit which stores a user ID in correspondence with user attribute information, a unit which holds the user ID of an accessible user in correspondence with each file or each folder, a unit which provides a display for selecting a user accessible to the file by using the attribute information when storing the file in the folder, a unit which determines whether the user ID corresponding to the selected attribute information coincides with the held user ID, and a unit which informs the user of a warning when it is determined that the user IDs do not coincide with each other.

11 Claims, 18 Drawing Sheets

FIG. 5

| FOLDER ID | FOLDER NAME | ID OF ACCESS-PERMITTED USER |
|---|---|---|
| 1 | PROJECT A | 1, 2, 6, 10 |
| 2 | FIRST DEVELOPMENT DEPARTMENT | 1, 2, 3, 4, 5, 6, 7, 8 |
| 3 | GENERAL AFFAIRS SECTION | 53, 55, 58, 59, 60 |
| 4 | CONFIDENTIAL | 1, 5, 8 |
| 5 | IMPORTANT DEVELOPMENT INFORMATION | 1, 2, 5, 6 |
| 6 | FIRST DEVELOPMENT SECTION | 2, 3, 4 |
| 7 | DEV. 2 | 1, 5, 6, 7 |
| : | : | : |

FIG. 6

| USER ID | USER NAME | MANAGERIAL POSITION |
|---|---|---|
| 1 | YAMADA | Y |
| 2 | SUZUKI | Y |
| 3 | MURATA | N |
| 4 | TANAKA | N |
| 5 | KAWAMURA | Y |
| 6 | HAYASHI | N |
| 7 | TAKAGI | N |
| 8 | ONO | Y |
| 9 | HASEGAWA | N |
| 10 | WATANABE | N |
| ⋮ | ⋮ | ⋮ |

F I G. 9

| USER ID | USER NAME | MANAGERIAL POSITION | HEAD OFFICE ID | DEPARTMENT ID | SECTION ID |
|---|---|---|---|---|---|
| 1 | YAMADA | Y | 100 | 110 | |
| 2 | SUZUKI | Y | 100 | 110 | 111 |
| 3 | MURATA | N | 100 | 110 | 111 |
| 4 | TANAKA | N | 100 | 110 | 111 |
| 5 | KAWAMURA | Y | 100 | 110 | 112 |
| 6 | HAYASHI | N | 100 | 110 | 112 |
| 7 | TAKAGI | N | 100 | 110 | 112 |
| 8 | ONO | Y | 200 | 210 | 211 |
| 9 | HASEGAWA | N | 200 | 210 | 211 |
| 10 | WATANABE | N | 200 | 210 | 211 |
| : | : | : | : | : | : |

FIG. 10

| ORGANIZATION ID | ORGANIZATION NAME | ORGANIZATION LEVEL | UPPER ORGANIZATION ID |
|---|---|---|---|
| 100 | DEVELOPMENT HEAD OFFICE | HEAD OFFICE | |
| 110 | FIRST DEVELOPMENT DEPARTMENT | DEPARTMENT | 100 |
| 111 | FIRST DEVELOPMENT SECTION | SECTION | 110 |
| 112 | SECOND DEVELOPMENT SECTION | SECTION | 110 |
| 200 | SALES HEAD OFFICE | HEAD OFFICE | |
| 210 | FIRST SALES DEPARTMENT | DEPARTMENT | 200 |
| 211 | FIRST SALES SECTION | SECTION | 210 |
| 300 | GENERAL AFFAIRS HEAD OFFICE | HEAD OFFICE | |
| ⋮ | ⋮ | ⋮ | ⋮ |

1001, 1002, 1003, 1004

F I G. 12

DOCUMENT REGISTRATION

- FIRST DEVELOPMENT DEPARTMENT
  - FIRST DEVELOPMENT SECTION
    - IMPORTANT DEVELOPMENT INFORMATION
  - FOLDER 4
- GENERAL AFFAIRS SECTION
- CONFIDENTIAL

FOLDER : FIRST DEVELOPMENT DEPARTMENT > IMPORTANT DEVELOPMENT INFORMATION

PLEASE INPUT DOCUMENT TO BE REGISTERED AND OPEN RANGE.

DOCUMENT TO BE REGISTERED : /home/suzuki/documents/important.txt    REFER TO...

OPEN RANGE : ☑ POST    ☑ ORGANIZATION
             1201      1202

MANAGERIAL POSITION ▷  1203
                    ▷  1204

WITHIN SECTION
WITHIN DEPARTMENT
WITHIN HEAD OFFICE
NOT DESIGNATE

REGISTER

FIG. 14

| DOCUMENT ID | DOCUMENT NAME | REGISTRATION FOLDER ID | OPEN TO MANAGERIAL POSITION | OPEN HEAD OFFICE ID | OPEN DEPARTMENT ID | OPEN SECTION ID |
|---|---|---|---|---|---|---|
| 1001 | BUDGET | 4 | Y | 100 | | |
| 1002 | KNOWN FAULTS | 5 | | 100 | | |
| 1003 | SYSTEM DESIGN SPECIFICATIONS | 6 | | | | 111 |
| 1004 | ANNUAL PLAN | 23 | Y | | 210 | |
| 1005 | MEETING OF LABOR UNION | 73 | N | | | |
| .. | .. | .. | .. | .. | .. | .. |

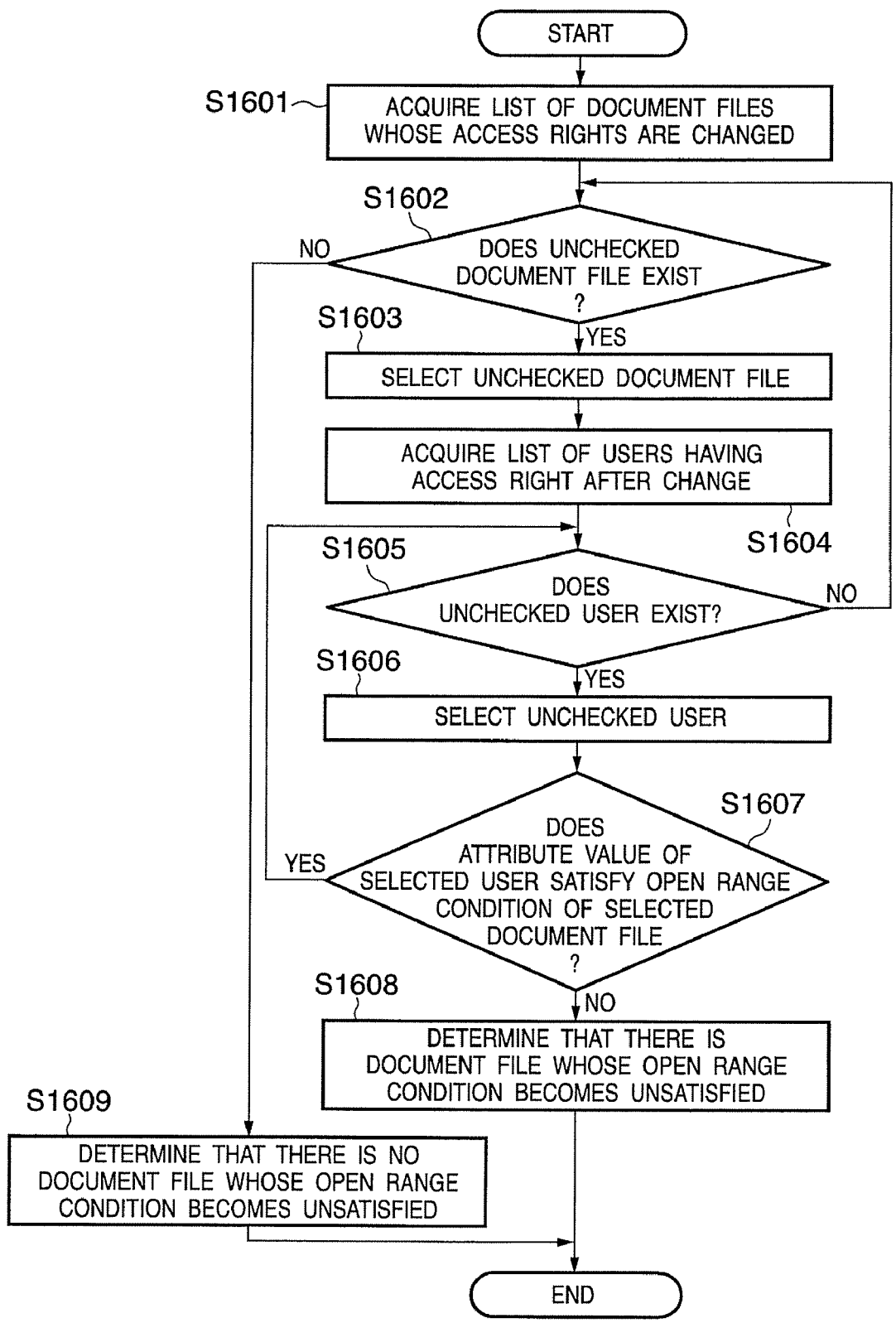

F I G. 17

DOCUMENT REGISTRATION

- FIRST DEVELOPMENT DEPARTMENT
  - FIRST DEVELOPMENT SECTION
    - IMPORTANT DEVELOPMENT INFORMATION
  - FOLDER 4
- GENERAL AFFAIRS SECTION
- CONFIDENTIAL

FOLDER : FIRST DEVELOPMENT DEPARTMENT > IMPORTANT DEVELOPMENT INFORMATION

⚠ THERE IS DOCUMENT WHOSE OPEN RANGE BECOMES VIOLATED BY CHANGE OF ACCESS RIGHT. DO YOU CHANGE ACCESS RIGHT ?

[ REGISTER ]   [ CANCEL ]

INFORMATION PROCESSING APPARATUS AND INFORMATION PROCESSING METHOD

BACKGROUND OF THE INVENTION

1. Field of the Invention

The present invention relates to a management technique of managing a file.

2. Description of the Related Art

There has conventionally been known a document management system in which a plurality of users share an electronic document file. In general, the document management system can set a right to access a document file and folder so as to limit the users who can refer to or edit a specific document file. The access right is the authority to allow a user or terminal to utilize shared resources such as a file and folder. A system administrator can use a network OS to set the level of authority given to each user.

There are various methods of selecting a user to whom a system administrator assigns an access right when setting a right to access a predetermined document file or folder.

A method of individually selecting each user registered in the system or a method of selecting a group of users to select each user belonging to the group is generally employed. There is also proposed a method of selecting a user attribute to select a user having this attribute (see Japanese Patent Application Laid-Open No. 2003-280990).

However, the conventional document management system has a problem that no general user (user other than a system administrator) can refer to who has a right to access a document file to be registered as a shared resource. A user not intended to see the document file may have the access right, or a user intended to see the document file may not have the access right. This will be exemplified.

For example, a user registers a document file in a document management system at his office, in order to open it to only users belonging to the same division as him. However, the user cannot confirm who actually has a right to access the registered document file and can refer to it. In other words, the user cannot confirm whether the access right is assigned within a desired range. If a user of another division has the access right, he can refer to the registered document file.

Even in the use of the selection method described in Japanese Patent Application Laid-Open No. 2003-280990, the same problem occurs when the attribute of a user having the access right is unknown.

Even if a user has a right to refer to who has the access right, it is very cumbersome to confirm who actually has the access right. The user sometimes skips the confirmation, posing the same problem.

SUMMARY OF THE INVENTION

The present invention has been made to overcome the conventional drawbacks, and has as its object to allow a user to easily confirm whether the access right is set within a desired range in a system which is used by a plurality of users and can set the access right.

In order to achieve the above object, an information processing apparatus according to the present invention comprises the following configuration.

That is, an information processing apparatus which manages a stored file, comprising:

user storage unit configured to store a user ID for identifying a user, in correspondence with attribute information of the user;

holding unit configured to hold a user ID of an accessible user in correspondence with each file or each storage location where the file is stored;

providing unit configured to provide a display for selecting a user accessible to the file by using the attribute information when storing the file;

extraction unit configured to extract a user ID stored in the user storage unit in correspondence with the selected attribute information;

first determination unit configured to determine whether the user ID extracted by the extraction unit coincides with the user ID held by the holding unit; and informing unit configured to inform the user of a warning when the first determination unit determines that the user IDs do not coincide with each other.

The present invention allows a user to easily confirm whether the access right is set within a desired range in the system which is used by a plurality of users and can set the access right.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing an example of access right information;

FIG. 6 is a table showing an example of user attribute information;

FIG. 9 is a table showing an example of user attribute information;

FIG. 10 is a table showing an example of organization information;

FIG. 12 is a view showing an example of a user interface window;

FIG. 14 is a table showing an example of an open range condition stored in association with a document file;

FIG. 16 is a flowchart showing a process sequence in the open range determination unit when changing an access right in the information processing apparatus according to the fourth embodiment of the present invention;

FIG. 17 is a view showing an example of a warning window displayed to a user.

DESCRIPTION OF THE EMBODIMENTS

Preferred embodiments of the present invention will now be described in detail in accordance with the accompanying drawings.

First Embodiment

Hardware Configuration of Information Processing Apparatus

Figure 1:
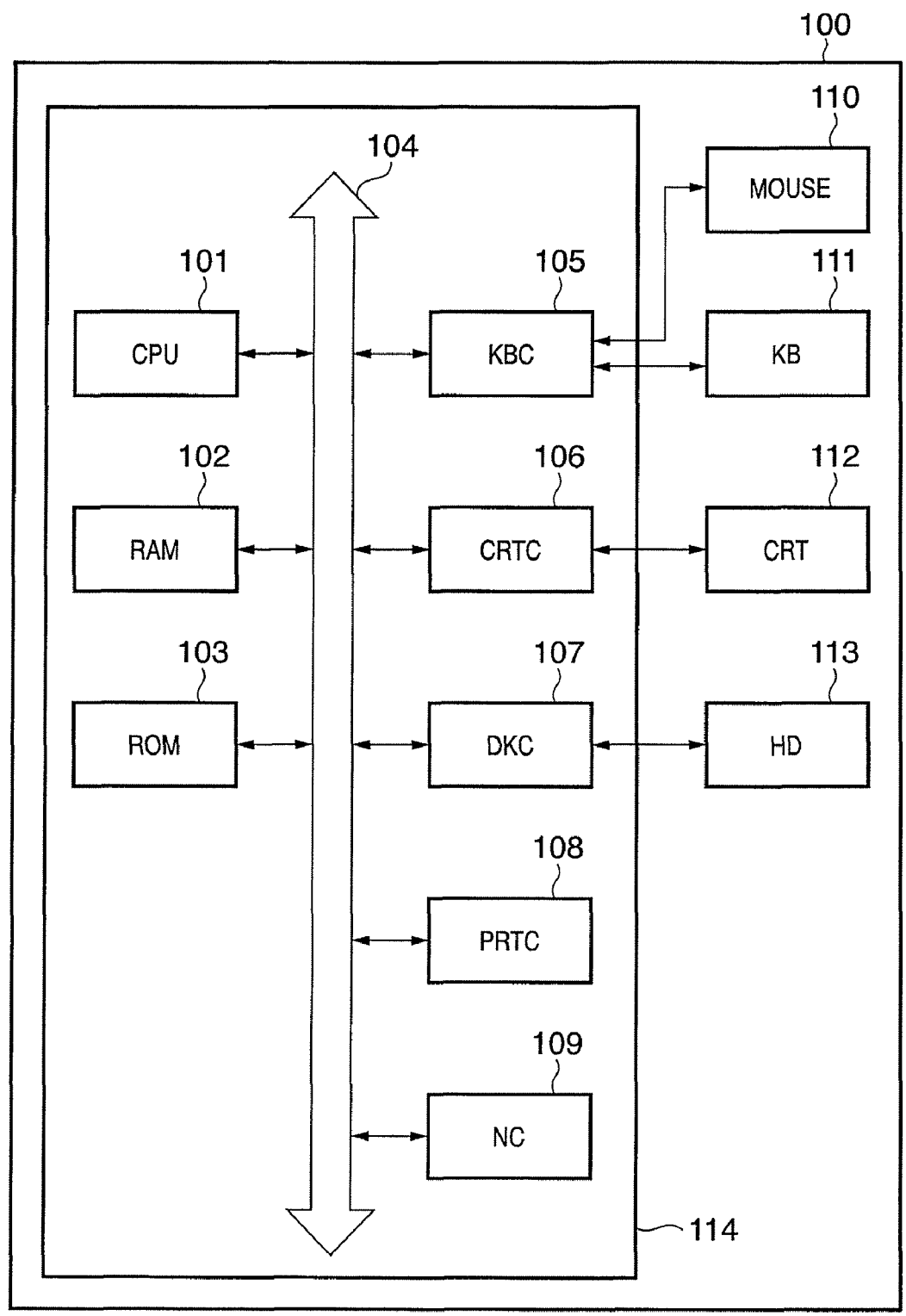
FIG. 1 is a block diagram showing an example of the hardware configuration of an information processing apparatus according to an embodiment of the present invention.

FIG. 1 is a block diagram showing the hardware configuration of an information processing apparatus 114 according to the embodiment of the present invention.

In FIG. 1, a CPU 101 executes an OS which is stored in the program ROM of a ROM 103 or loaded from a hard disk (HD) 113 to a RAM 102, and also executes programs such as a document registration unit 201 and open range determination unit 202 (to be described later). The RAM 102 functions as a main memory, work area, and the like for the CPU 101.

A keyboard controller (KBC) 105 controls a key input from a keyboard (KB) 111 or an input from a mouse 110 serving as a pointing device. A CRT controller (CRTC) 106 controls display on a display 112 such as a CRT.

The display 112 is not limited to the CRT, and may be a liquid crystal display or the like. A disk controller (DKC) 107 controls access between an external storage device (not shown) such as a flexible disk, and the hard disk (HD) 113 which stores a boot program, various applications, user data, and the like. A PRTC 108 controls exchange of signals with a printer when the printer is connected. An NC 109 connects to a network to execute a communication control process with another network-connected device.

The information processing apparatus 114 in FIG. 1 is only an embodiment of the present invention. The information processing apparatus may include, for example, the mouse 110, KB 111, display 112, and HD 113.

<Functional Arrangement of Information Processing Apparatus>

Figure 2:
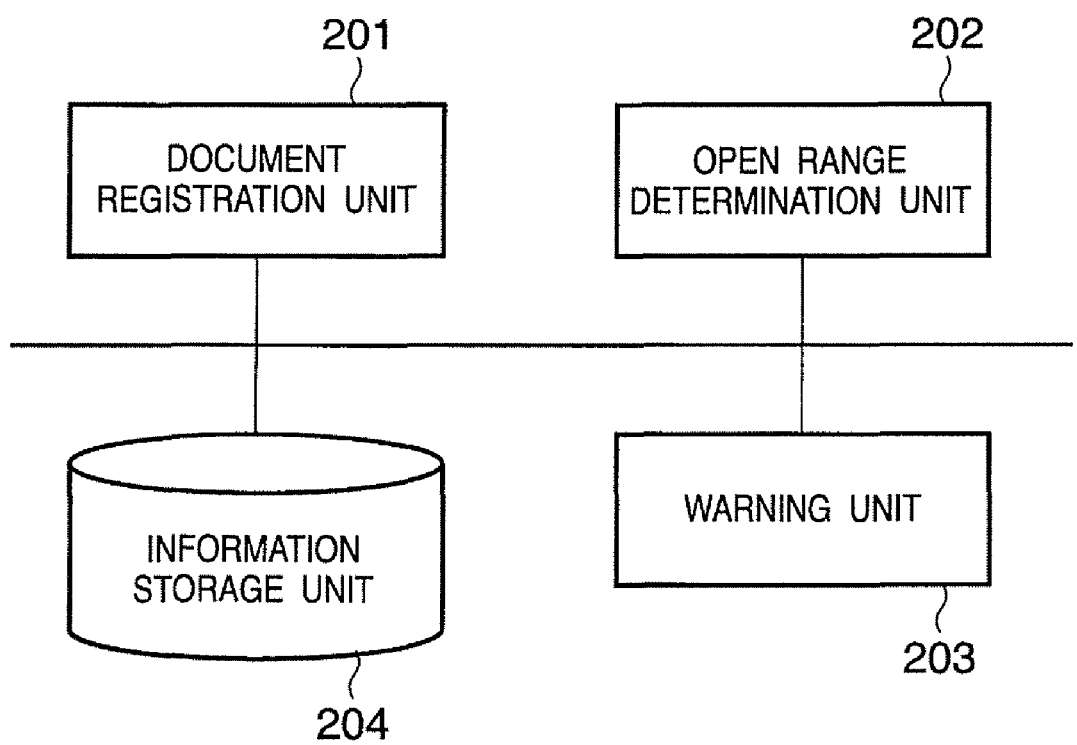
FIG. 2 is a block diagram showing the functional arrangement of the information processing apparatus according to the first to third embodiments of the present invention.

FIG. 2 is a block diagram showing the functional arrangement of the information processing apparatus according to the embodiment of the present invention.

In FIG. 2, the document registration unit 201 receives a document file to be registered, and the open range condition of the document file based on a destination folder and user attribute information, and registers the document file in the information processing apparatus. A user registers a document file by using the keyboard 111 and mouse 110 to provide an input through a user interface window displayed on the display 112. The open range determination unit 202 determines whether the open range condition of a document file to be registered in the document registration unit 201 is satisfied.

Reference numeral 203 denotes a warning unit which generates a warning through the display 112 to a user who is to register a document file when the open range determination unit 202 determines that no condition is satisfied. Reference numeral 204 denotes an information storage unit which stores various types of information (e.g., a document file, access right information, and user attribute information) necessary for the information processing apparatus. In the first embodiment, the hard disk 113 stores these pieces of information.

For descriptive convenience, in the first embodiment, the right to access each folder has already been set, and the right to access a document file complies with the right to access a destination folder.

<Process Sequence in Information Processing Apparatus>

Figure 3:
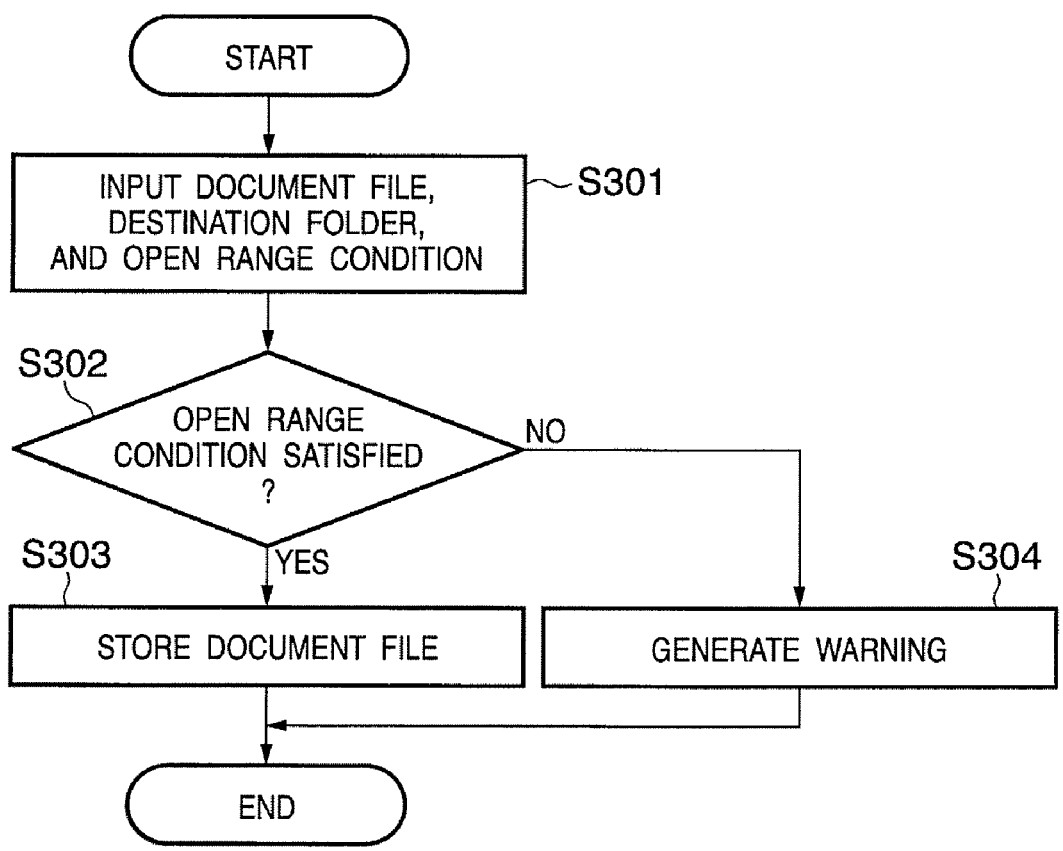
FIG. 3 is a flowchart showing a process sequence when registering a document file in the information processing apparatus according to the first embodiment of the present invention.

FIG. 3 is a flowchart showing the operation of the information processing apparatus according to the embodiment.

in step S301, the document registration unit 201 accepts a document file to be registered, a destination folder, and open range condition.

In step S302, the open range determination unit 202 determines whether the open range condition designated in step S301 is satisfied for the access right set to the destination folder. If YES in step S302, a process in step S303 is performed; if NO, a process in step S304 is performed. A detailed step of condition determination in step S302 will be described later.

In step S303, the document registration unit 201 stores the document file designated in step S301 in the information storage unit 204. In step S304, the warning unit 203 generates a warning that the destination folder of the document file to be registered is improper as the open range condition.

<Process Sequence in Open Range Determination Unit>

Figure 4:
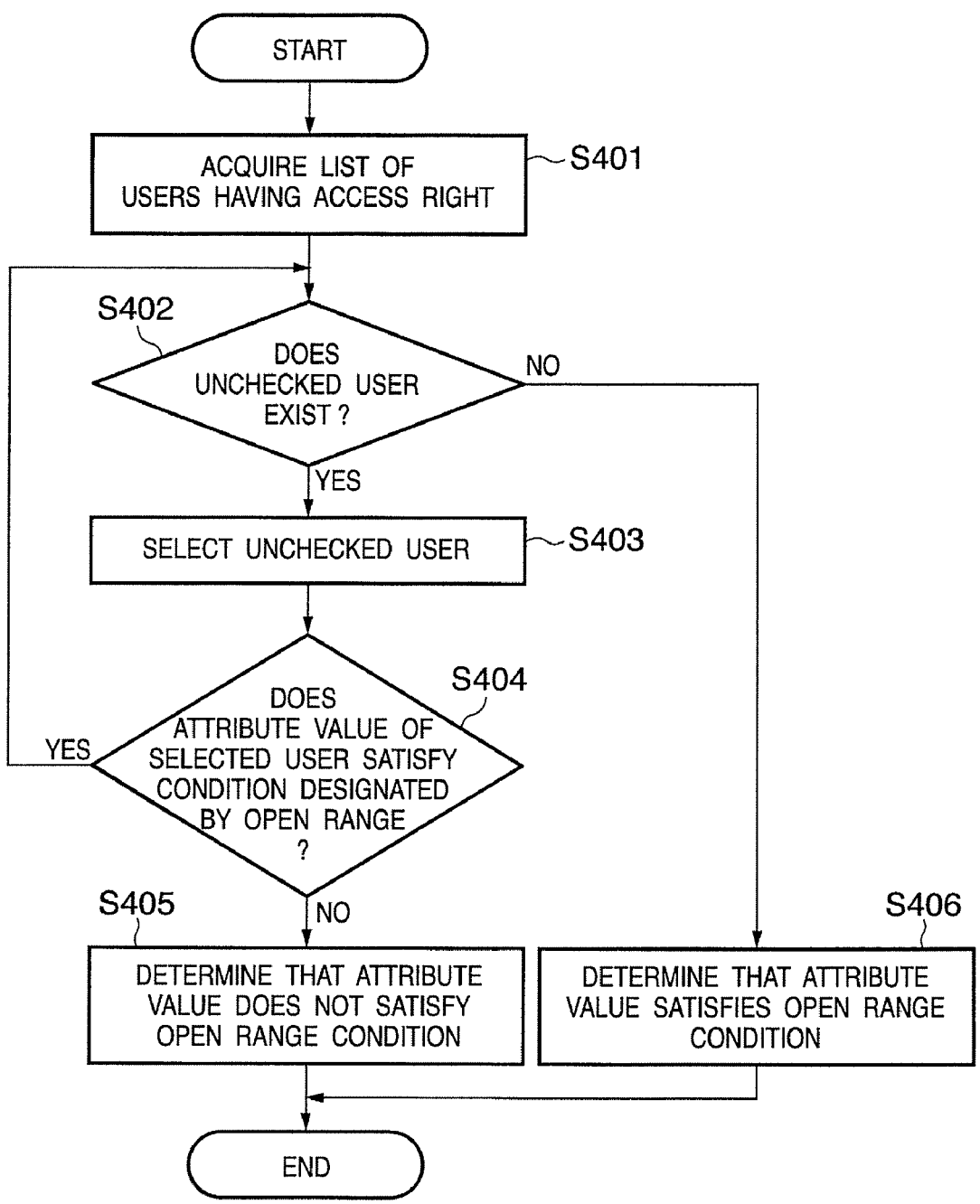
FIG. 4 is a flowchart showing a process sequence in the open range determination unit of the information processing apparatus according to the first embodiment of the present invention.

FIG. 4 is a flowchart showing a detailed step of condition determination in step S302.

In step S401, the open range determination unit 202 acquires a list of users permitted to access a designated destination folder from the destination (folder) information designated in step S301. In step S402, if a user whose attribute information has not been checked exists among the users acquired in step S401, the process advances to step S403. If the open range determination unit 202 has checked attribute information of all the acquired users, the process shifts to step S406.

In step S403, the open range determination unit 202 selects one of users whose attribute information has not been checked. In step S404, the open range determination unit 202 checks whether attribute information of the user selected in step S403 satisfies the open range condition designated in step S301. If the attribute information satisfies the open range condition, the process shifts to step S402. If no attribute information satisfies the open range condition, the process shifts to step S405.

In step S405, the open range determination unit 202 sends back, as the process result of step S302, determination that no open range condition is satisfied, ending a series of processes. In step S406, the open range determination unit 202 sends back, as the process result of step S302, determination that the open range condition is satisfied, ending a series of processes.

The above process will be explained using a concrete example.

<Access Right Information>

FIG. 5 shows an example of access right information stored in the information storage unit 204. The access right information is held for each folder as the user ID of an access-permitted user. For example, users permitted to access a folder "first development department" of a folder ID=2 are those of user IDs=1, 2, 3, 4, 5, 6, 7, and 8.

<User Attribute Information>

FIG. 6 shows an example of user attribute information stored in the information storage unit 204. In this example, each user has a user ID, a user name, and an attribute "managerial position". The managerial position attribute takes a value "Y" or "N". "Y" means that the user is a manager, and "N" means that the user is not a manager.

A case will be explained where a user "Suzuki" having a user ID "2" in FIG. 6 is to register a document file he wants to disclose to only managers, in an "important development information" folder having a folder ID "5" in FIG. 5.

<User Interface>

Figure 7:
FIG. 7 is a view showing an example of a user interface window.

FIG. 7 shows an example of a user interface window for an input from a user in step S301. In FIG. 7, while a destination "important development information" folder 703 is open, the user "Suzuki" executes a document file registration process, and designates a document file 701 to be registered and "managerial position" 702 serving as an open range condition. When receiving information from the document registration unit 201, the open range determination unit 202 acquires, from the information storage unit 204, the IDs: 1, 2, 5, and 6 of users accessible to the "important development information" folder 703 in step S401 (see FIG. 5).

In steps S402 to S404, the open range determination unit 202 acquires the value of the managerial position attribute for each acquired user ID, and checks whether the value matches a content input as the open range condition. Since "managerial position" is designated as the open range condition in step S301, the open range determination unit 202 determines whether there is a user whose managerial position attribute value is not "Y".

Figure 8:
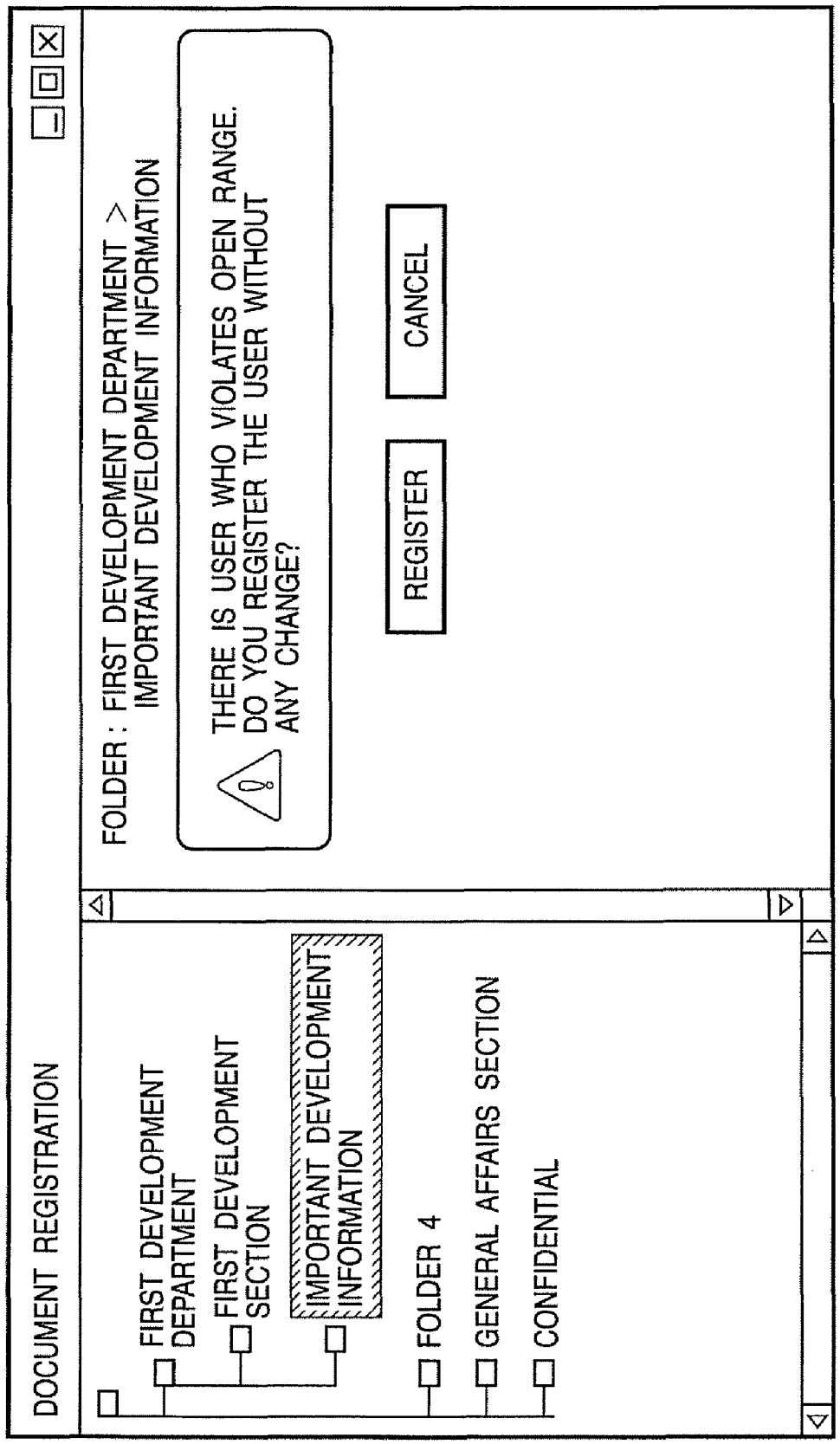
FIG. 8 is a view showing an example of a warning window displayed to a user.

Since the managerial position attribute value of a user "Hayashi" having a user ID "6" is "N", the open range determination unit 202 determines that the user is not a manager (see FIG. 6). That is, the user "Hayashi" does not satisfy the open range condition, so the open range determination unit 202 determines that no open range condition is satisfied. In step S304, the warning unit 203 displays a warning window as shown in FIG. 8 to the user "Suzuki" who is to register the document file. After receiving the warning, the user "Suzuki" can ignore the warning and register the document file, or can cancel the registration and register the document file in another destination folder.

As is apparent from the above description, when storing a file, the information processing apparatus according to the first embodiment provides a display for selecting a desired user as a user accessible to the file. A user who is to store the file can input a desired open range condition of the file.

The information processing apparatus according to the first embodiment determines whether an open range condition desired by a user for a file matches an access right set in advance to the file or the folder of the file. This enables confirming whether a user accessible to a document file to be registered is an intended one when registering the document. As a result, the information processing apparatus can avoid an unexpected situation in which the document file is open to an unintended user.

Second Embodiment

The second embodiment of the present invention will be explained.

A feature of an information processing apparatus according to the second embodiment is to hold, as user attribute information, information on an organization to which a user belongs. Another feature is to designate an open range condition in the form (e.g., open within the section) of whether the target user belongs to the same organization as that of a user who is to register a document file. Except for these features, the hardware configuration, operation sequence, and the like are the same as those in FIGS. 1 to 4 described in the first embodiment, and a description thereof will be omitted.

<User Attribute Information>

FIG. 9 shows an example of user attribute information stored in an information storage unit 204 according to the second embodiment. In this example, each user has a head office ID 901, department ID 902, and section ID 903 of organizations to which the user belongs. The information storage unit 204 stores detailed information (organization information) on the hierarchical relationship between these organizations in a form as shown in FIG. 10. Values described as the head office ID 901, department ID 902, and section ID 903 in FIG. 9 indicate an organization ID 1001 in FIG. 10. For example, a user "Kawamura" of a user ID "5" in FIG. 9 belongs to the second development section of the first development department of the development head office.

<Organization Information>

An organization level 1003 in FIG. 10 represents the hierarchical position of an organization in an entire hierarchical organization. In the second embodiment, the hierarchical organization is made up of "head office", "department", and "section" sequentially from an upper organization. An upper organization ID 1004 means the ID of an upper organization in the hierarchical organization. For example, the upper organization of the first development section is the first development department, and the upper organization of the first development department is the development head office.

A case will be explained where the user "Kawamura" of the user ID "5" in FIG. 9 is to register a document file he wants to disclose to only users within his department, in a "first development section" folder of the folder ID "2".

<User Interface>

Figure 11:
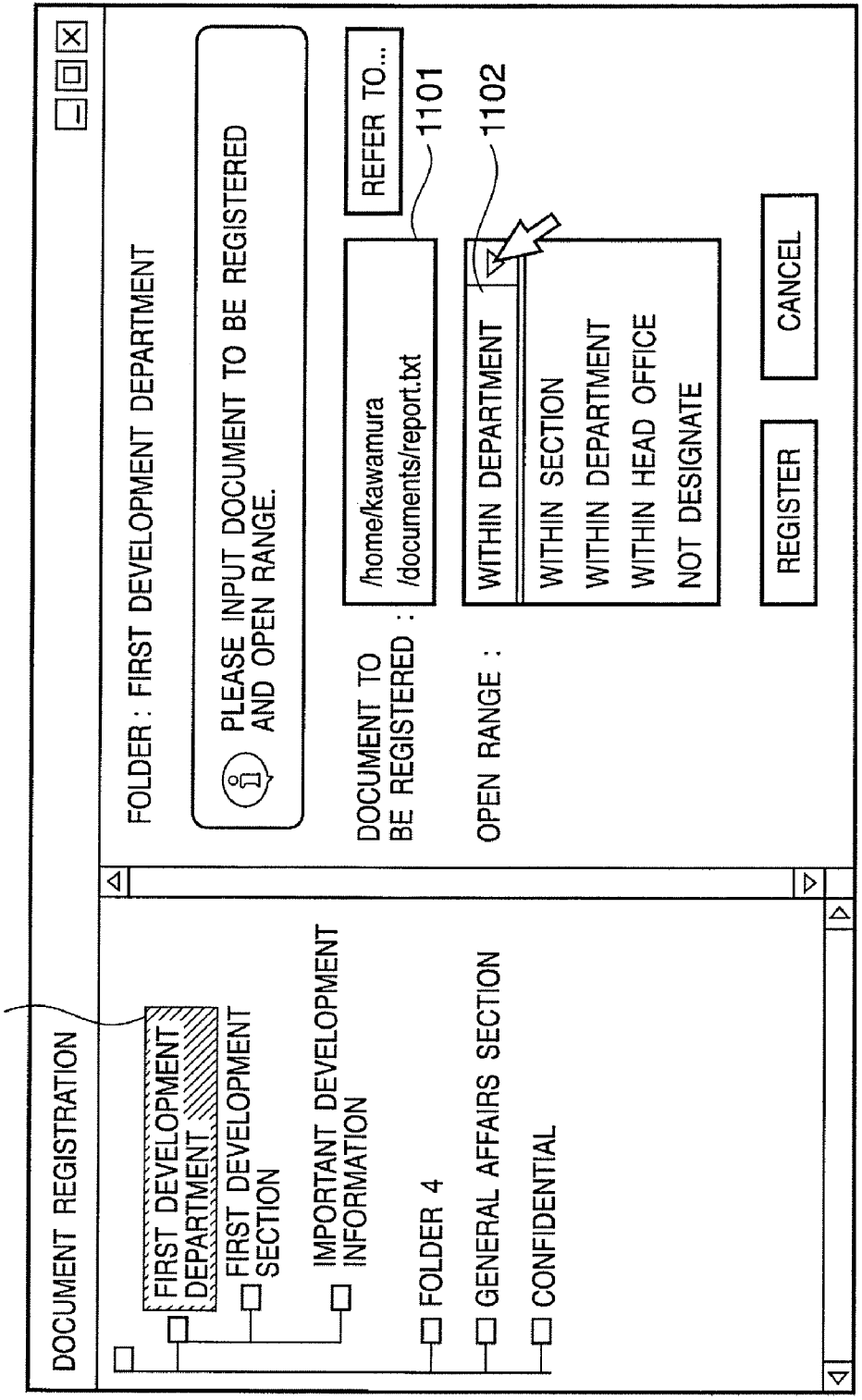
FIG. 11 is a view showing an example of a user interface window.

FIG. 11 shows an example of a user interface window in step S301. In FIG. 11, while selecting a "first development department" folder 1103, the user "Kawamura" of the user ID=5 executes a document file registration process, and designates a document file 1101 to be registered and an open range condition "within the department" 1102. The open range condition is that a user has the same department ID 902 "110" as that of "Kawamura". When receiving an input in step S301, an open range determination unit 202 acquires, from access right information in FIG. 5 stored in the information storage unit 204, the IDs: 1, 2, 3, 4, 5, 6, 7, and 8 of users having a right to access the "first development department" folder 1103.

In steps S402, S403, and S404, the open range determination unit 202 checks whether a user having each user ID satisfies the open range condition "the department ID is 110". The department ID 902 of a user "Ono" having a user ID "8" in FIG. 9 is 210, and the user "Ono" does not satisfy the open range condition. In step S302, the open range determination unit 202 determines that no open range condition is satisfied. In step S304, a warning unit 203 displays a warning window as shown in FIG. 8 to the user "Kawamura".

As is apparent from the above description, when registering a document, the information processing apparatus according to the second embodiment allows a user who is to register a document file, to confirm whether a user of another division can access the document file to be registered. The information processing apparatus can avoid an unexpected situation in which the document file not intended to be open outside the division is open outside the division.

Third Embodiment

The third embodiment of the present invention will be explained. An information processing apparatus can designate pieces of attribute information as an open range condition.

The arrangement, operation sequence, and information stored in an information storage unit 204 according to the third embodiment are the same as those in FIGS. 1 to 5, 9, and 10 described in the first and second embodiments, and a description thereof will be omitted.

<User Interface>

FIG. 12 shows an example of a user interface window in step S301. In FIG. 12, a user who is to register a document file marks both check boxes 1201 and 1202 as open range conditions, and can use two pieces of attribute information on the managerial position and organization.

An unmarked check box means that corresponding attribute information is not set as an open range condition. When marking the check boxes, a user can select values from drop-down lists 1203 and 1204 corresponding to the respective check boxes, and designates the values as conditions.

For example, a case will be explained where a user "Suzuki" of a user ID "2" in FIG. 9 is to register a document file. When both the check boxes 1201 and 1202 are ON, "managerial position" is selected from the drop-down list 1203, and "within the section" is selected from the drop-down list 1204, the open range conditions are "the managerial position attribute is 'Y' and the section ID is 111".

As is apparent from the above description, according to the third embodiment, a user who is to register a document file can designate open range conditions on the basis of pieces of attribute information. In a document file registration process, the user can confirm in more detail a user who becomes accessible to the document file to be registered. The third embodiment can avoid an unexpected situation in which the document is open to an unintended user.

Fourth Embodiment

The fourth embodiment of the present invention will be explained.

<Functional Arrangement of Information Processing Apparatus>

Figure 13:
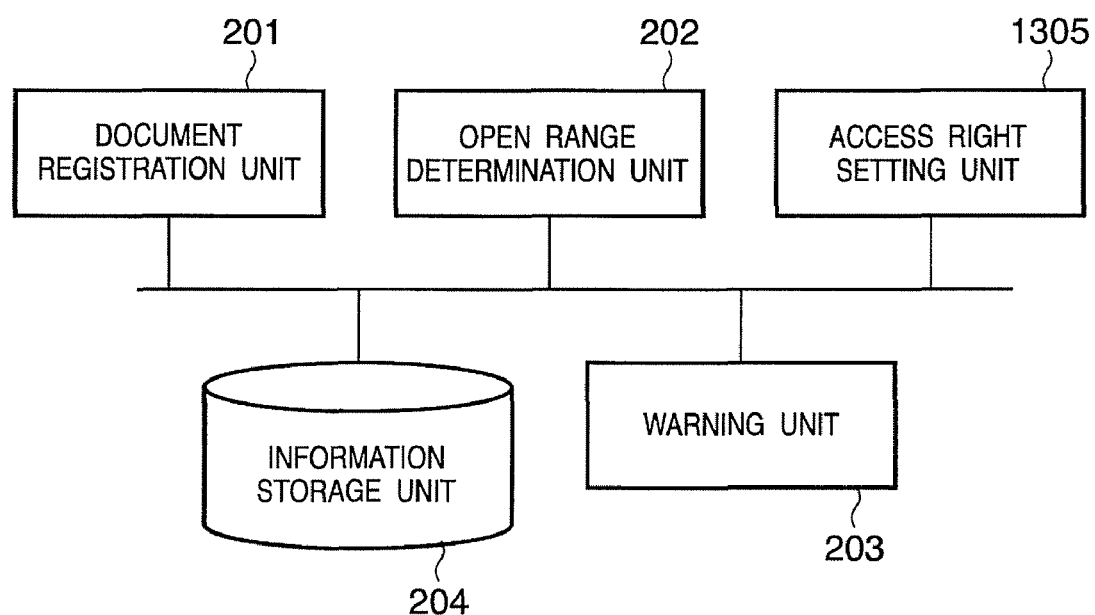
FIG. 13 is a block diagram showing the functional arrangement of an information processing apparatus according to the fourth embodiment of the present invention.

FIG. 13 is a block diagram showing the functional arrangement of an information processing apparatus according to the embodiment of the present invention. The same reference numerals as those in FIG. 2 in the first embodiment denote the same elements, and a description thereof will be omitted. Only different elements will be explained.

Reference numeral 1305 denotes an access right setting unit which designates an access right setting target (folder or document file) and a user to be given the access right, and sets the access right to the target document file or folder. A document registration unit 201 stores an open range condition input in step S301 in an information storage unit 204 in a form as shown in FIG. 14 in association with a registered document file. When the access right setting unit 1305 is to change the access right, an open range determination unit 202 determines whether the change content satisfies the open range condition of a document file whose access right is to be changed.

<Process Sequence in Information Processing Apparatus>

Figure 15:
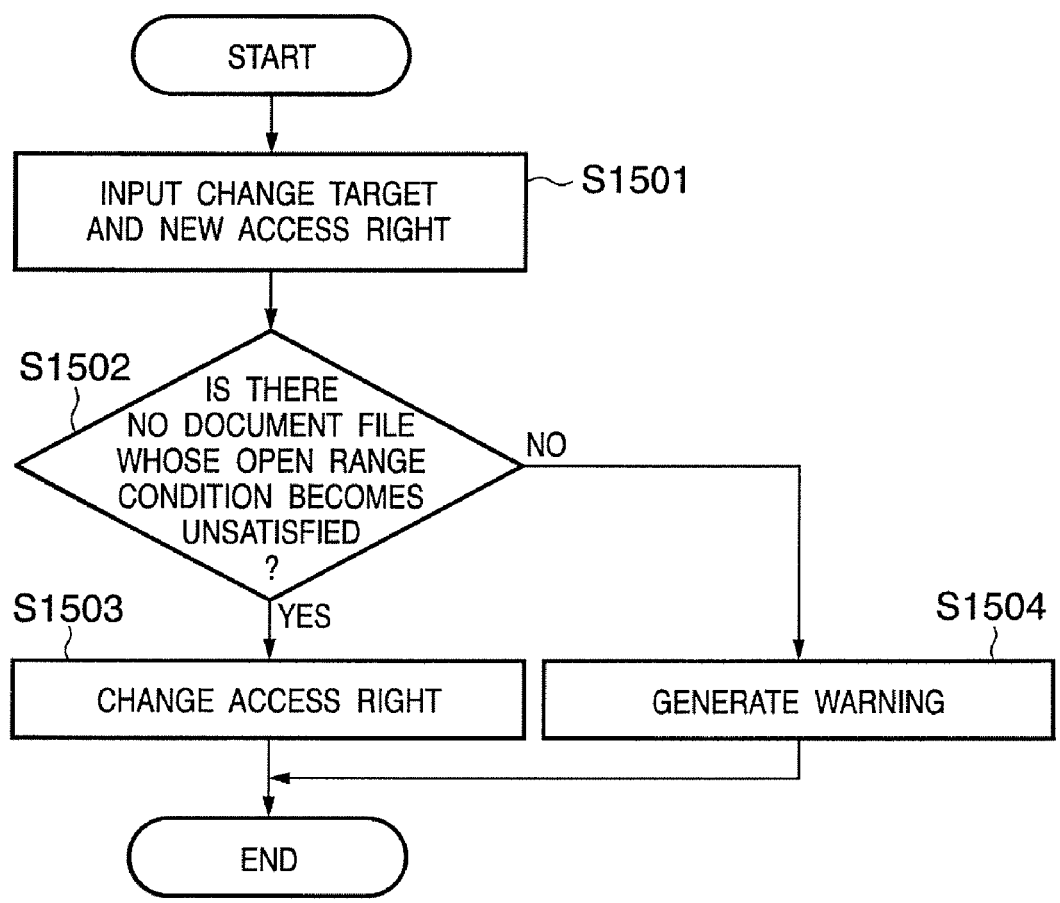
FIG. 15 is a flowchart showing a process sequence when changing an access right in the information processing apparatus according to the fourth embodiment of the present invention.

FIG. 15 is a flowchart showing an operation to change the access right.

In step S1501, the access right setting unit 1305 accepts input of a folder or document file whose access right is to be changed, and input of a new open range condition. At this time, the access right is so input as to select attribute information of a user permitted to access the target folder or document file.

In step S1502, the open range determination unit 202 determines whether a change of the access right generates a document file whose open range condition becomes unsatisfied. A detailed step of condition determination in step S1502 will be described later. If the open range determination unit 202 determines that there is no document file whose open range condition becomes unsatisfied (YES in step S1502), the process shifts to step S1503; if NO, to step S1504.

In step S1503, the access right setting unit 1305 stores new access right information in the information storage unit 204. In step S1504, a warning unit 203 displays a warning to a user who is to set the access right.

<Process Sequence in Open Range Determination Unit>

FIG. 16 is a flowchart showing a detailed step of condition determination in step S1502.

In step S1601, the open range determination unit 202 acquires a list of document files whose access rights are changed. In step S1602, if an unchecked document file exists among the document files acquired in step S1601, the process shifts to step S1603. If the open range determination unit 202 has checked all the document files, the process shifts to step S1609. In step S1603, the open range determination unit 202 selects an unchecked document file among the document files acquired in step S1601.

In step S1604, the open range determination unit 202 acquires a list of users having the right to access the document file selected in step S1603 after changing the access right. In step S1605, if an unchecked user exists among the users acquired in step S1604, the process shifts to step S1606. If the open range determination unit 202 has checked all the users, the process shifts to step S1602.

In step S1606, the open range determination unit 202 selects an unchecked user among the users acquired in step S1604.

In step S1607, the open range determination unit 202 checks whether attribute information of the user selected in step S1606 satisfies the open range condition of the document file selected in step S1603. If the open range determination unit 202 determines that the attribute information satisfies the open range condition, the process shifts to step S1605. If the open range determination unit 202 determines that no attribute information satisfies the open range condition, the process shifts to step S1608.

In step S1608, the open range determination unit 202 sends back, as its determination result, determination that there is a document file whose open range condition becomes unsatisfied, ending a series of processes.

In step S1609, the open range determination unit 202 sends back, as its determination result, determination that there is no document file whose open range condition becomes unsatisfied, ending a series of processes.

As is apparent from the above description, the fourth embodiment is effective when a user (system administrator or the like) who can change the access right is to change, through the access right setting unit 1305, a right to access a document file after registering the document file. More specifically, a warning can be generated to a user (system administrator or the like) who is to change the access right when changing the access right to one which does not satisfy the open range condition of the document file.

Example

The above process will be explained using a concrete example. Assume that a user "Yamada" of a user ID "1" in FIG. 9 has the authority to set a right to access an "important development information" folder of a folder ID "5" in FIG. 5. A case will be explained where the user "Yamada" is to change users having the right to access the "important development information" folder from users of user IDs: 1, 2, 5, and 6 to those of user IDs: 1, 2, 5, and 8.

First, in step S1501, the change is accepted from the user "Yamada". Then, the open range determination unit 202 determines whether there is a document file whose open range condition becomes unsatisfied.

In step S1601, the open range determination unit 202 acquires a list of document files whose access rights are changed because they are stored in the "important development information" folder. At this time, the open range determination unit 202 acquires a document file "known faults" having a registration folder ID "5" and a document ID "1002" shown in FIG. 14. In step S1602, the open range determination unit 202 determines that the document file "known faults" has not been checked, and the process shifts to step S1603.

In step S1603, the target document file is only "known faults", and the open range determination unit 202 selects it. In step S1604, the open range determination unit 202 acquires user IDs: 1, 2, 5, and 8 as a list of users having the access right after the change of the access right.

In steps S1605, S1606, and S1607, the open range determination unit 202 checks whether a user having each user ID satisfies the open range condition "head office ID is 100" of the document file "known faults".

The head office ID of the user "Ono" having a user ID "8" in FIG. 9 is 200, and the user "Ono" does not satisfy the open range condition. Hence, in step S1608, the open range determination unit 202 sends back, to step S1502, determination that no open range condition is satisfied. In step S1504, the warning unit 203 displays a warning window as shown in FIG. 17 to the user "Yamada".

According to the fourth embodiment, when changing the access right setting, a user who can change the access right setting can confirm whether there is a document file whose open range condition becomes unsatisfied. The fourth embodiment can avoid an unexpected situation in which an access right not intended by a user who registers a document file is set.

Fifth Embodiment

The fifth embodiment of the present invention will be explained. An information processing apparatus according to the fifth embodiment can designate a condition "include at least all the users of the first development section" as an open range condition.

The arrangement of the information processing apparatus, the basic sequence to register a document file, and information stored in an information storage unit 204 according to the fifth embodiment are the same as those in FIGS. 1, 2, 3, 5, 9, and 10 described in the first and second embodiments, and a description thereof will be omitted.

<Process Sequence in Information Processing Apparatus>

Figure 18:
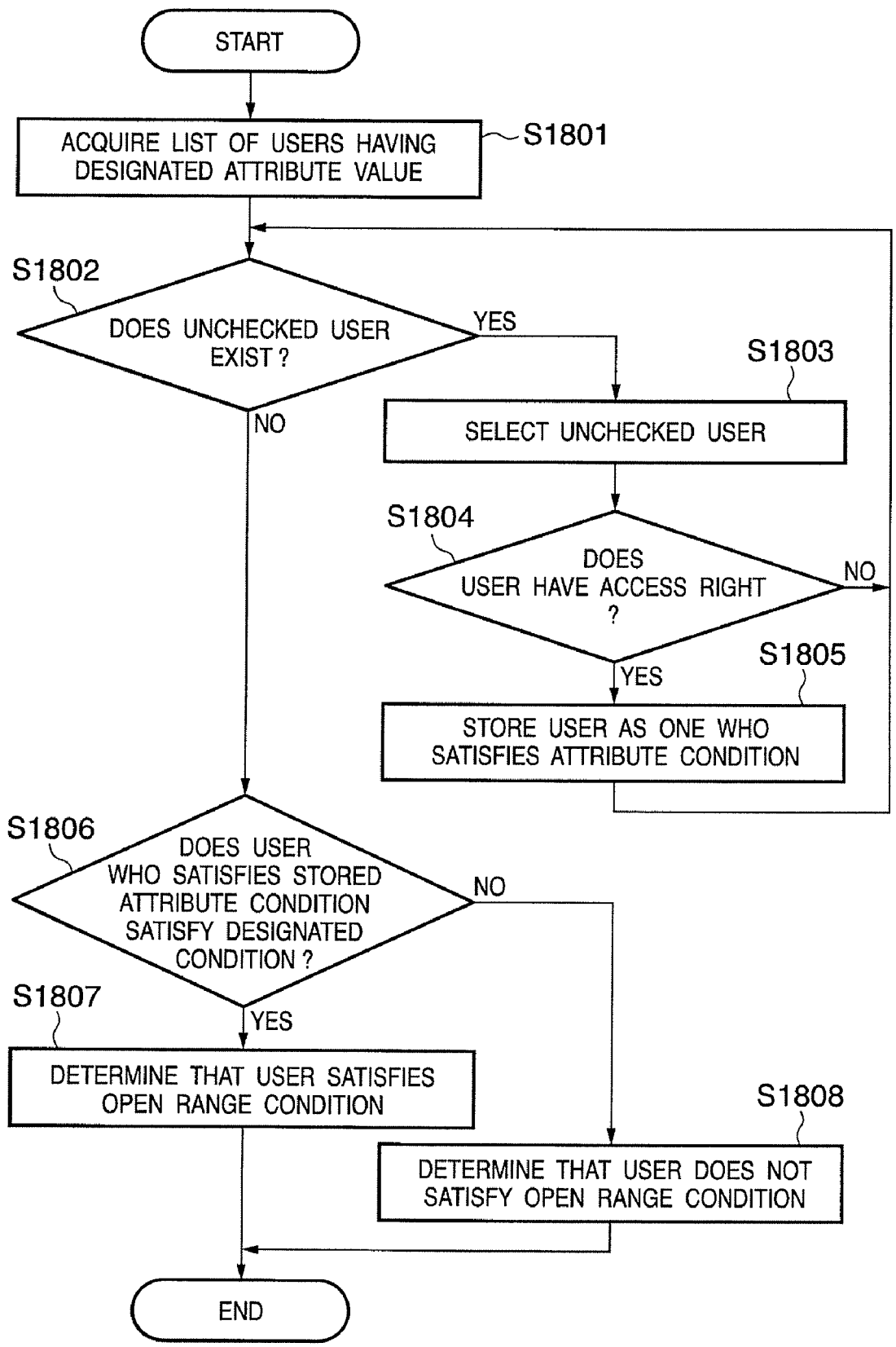
FIG. 18 is a flowchart showing a process sequence in the open range determination unit of an information processing apparatus according to the fifth embodiment of the present invention.

FIG. 18 is a flowchart showing a detailed sequence of a process by an open range determination unit 202 in step S302 in the information processing apparatus according to the fifth embodiment.

In step S1801, the open range determination unit 202 acquires a list of users having attribute information designated as an open range in step S301. In step S1802, if an unchecked user exists among the users acquired in step S1801, the process shifts to step S1803. If the open range determination unit 202 has checked all the users, the process shifts to step S1806.

In step S1803, the open range determination unit 202 selects an unchecked user among the users acquired in step S1801. In step S1804, the open range determination unit 202 checks whether the user selected in step S1803 has a right to access a destination folder designated in step S301. If the open range determination unit 202 determines that the user has the access right (YES in step S1804), the process shifts to step S1805; if NO, to step S1802.

In step S1805, the open range determination unit 202 temporarily stores the user selected in step S1803 as a user (user who satisfies the attribute condition) having attribute information designated by the open range condition and having the right to access the designated destination folder. Then, the process returns to step S1802.

In step S1806, the open range determination unit 202 determines whether a list of users (users who satisfy the attribute condition) temporarily stored in step S1805 satisfies the open range condition.

If the open range determination unit 202 determines that the user list satisfies the open range condition (YES in step S1806), the process shifts to step S1807; if NO, to step S1808. In step S1807, the open range determination unit 202 sends back, as its determination result, determination that the designated open range condition is satisfied, ending a series of processes. In step S1808, the open range determination unit 202 sends back, as its determination result, determination that no designated open range condition is satisfied, ending a series of processes.

Example

The above process will be explained using a concrete example. A case will be explained where a user "Yamada" of a user ID "1" in FIG. 9 registers, in a folder "Dev. 2" of a folder ID "7" in FIG. 5, a document file to be open to at least all the users of the "second development section" of an organization ID 1001 "112" in FIG. 10.

First, in step S301, a document registration unit 201 accepts, from the user "Yamada", a destination folder "Dev. 2" (folder ID=7), and information "include at least all the users of the second development section" as an open range condition. After receiving the information from the document registration unit 201, the open range determination unit 202 operates as follows. More specifically, in step S1801, the open range determination unit 202 acquires user IDs: 5, 6, and 7 corresponding to a section ID 903 "112" (see FIG. 10), as attribute information corresponding to the "second development section" designated in step S301 (see FIG. 9).

In steps S1802 to S1804, the open range determination unit 202 checks whether each user acquired in step S1801 has a right to access the destination folder "Dev. 2". Users having the right to access the destination folder "Dev. 2" are those of user IDs: 1, 5, 6, and 7 (see FIG. 5), and user IDs: 5, 6 and 7 are stored in step S1805.

In step S1806, the open range determination unit 202 checks whether the users of the user IDs: 5, 6, and 7 are all users belonging to the "second development section". In FIG. 10, the organization ID 1001 of the "second development section" is 112, and an organization level 1003 is "section". From this, users having the section ID 903 "112" belong to the "second development section", obtaining the user IDs: 5, 6, and 7 (see FIG. 9). Since the users of the user IDs: 5, 6, and 7 stored in step S1805 are all users belonging to the "second development section", the open range determination unit 202 determines that the open range condition is satisfied.

According to the fifth embodiment, when registering the document file, a user who registers a document file can confirm whether another user intended to see the document file has a right to access the registered document file. The fifth embodiment can avoid an unexpected situation in which no document file can be open to an intended user.

Other Embodiment

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a storage medium which records software program codes for implementing the functions of the above-described embodiments to a system or apparatus. In this case, these functions are achieved by reading out and executing the program codes stored in the storage medium by the computer (or the CPU or MPU) of the system or apparatus. In this case, the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The present invention is not limited to a case where the functions of the above-described embodiments are implemented when the computer executes the readout program codes. Also, the present invention includes a case where an OS (Operating System) or the like running on the computer performs some or all of actual processes on the basis of the instructions of the program codes and thereby implements the functions of the above-described embodiments.

Furthermore, the present invention includes a case where the functions of the above-described embodiments are implemented after the program codes read out from the storage medium are written in the memory of a function expansion board inserted into the computer or the memory of a function expansion unit connected to the computer. That is, the present invention also includes a case where after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-370895, filed on Dec. 22, 2005, which is hereby incorporated by reference herein in its entirety.

What is claimed is:

1. An information processing apparatus which manages a stored file, wherein the information processing apparatus is implemented by executing a computer program stored in a memory by a computer, the apparatus comprising:
   a user storage unit configured to store user IDs for identifying each user, in correspondence with attribute information of each of the users;
   a holding unit configured to hold user IDs of accessible users in correspondence with each of a plurality of folders;
   a selection unit for prompting a user to select a new file to be stored, a destination folder into which the new file is stored, and an open range condition for the new file in the selected destination folder, wherein the selection unit is configured so that, in response to the prompting, the user can arbitrarily select the open range condition regardless of the user IDs held by said holding unit in correspondence with the selected destination folder;
   an extraction unit configured to extract, from said holding unit, all user IDs accessible to the destination folder selected by said selection unit;
   a first determination unit configured to compare the attribute information corresponding to each of the user IDs accessible to the selected destination folder, which are extracted by said extraction unit, with the open range condition selected by said selection unit, to determine whether or not, among the user IDs accessible to the selected destination folder, there is a user ID corresponding to attribute information that does not satisfy the selected open range condition;
   an informing unit configured to inform the user of a warning without storing the new file into the selected destination folder when said first determination unit determines that, among the user IDs accessible to the selected destination folder, there is at least one user ID corresponding to attribute information that does not satisfy the selected open range condition; and
   a storing unit configured to store the new file into the selected destination folder when said first determination unit determines that, among the user IDs accessible to the selected destination folder, there is no user ID corresponding to attribute information that does not satisfy the selected open range condition.

2. The apparatus according to claim 1, wherein the attribute information contains information on an organization to which the user belongs, and said user storage unit further stores information representing a hierarchical relationship of the organizations.

3. The apparatus according to claim 1, further comprising:
   a file storage unit configured to store the selected open range condition for the new file; and
   a second determination unit configured to, when changing the user IDs held in said holding unit in correspondence with each of the plurality of folders, determine, for each file, whether the attribute information corresponding to each of the user IDs after the change satisfies the open range condition stored in said file storage unit,
   wherein when said second determination unit determines that the attribute information corresponding to each of the user IDs after the change does not satisfies the open range condition, said informing unit informs the user of a warning.

4. An information processing method of managing a stored file, comprising:
   a user storage step of storing a user ID for identifying each user, in correspondence with attribute information of each of the users;
   a holding step of holding user IDs of accessible users in correspondence with each of a plurality of folders;
   a selection step of prompting a user to select a new file to be stored, a destination folder into which the new file is stored, and an open range condition for the new file in the selected destination folder, wherein in response to the prompting, the user can arbitrarily select in said selection step the open range condition for accessing the new file regardless of the user IDs held in said holding step in correspondence with the selected destination folder;

an extraction step of extracting, from the user IDs held in said holding step, all user IDs accessible to the destination folder selected in said selection step;

a first determination step of comparing the attribute information corresponding to each of the user IDs accessible to the selected destination folder, which are extracted in the extraction step, with the open range condition selected in the selection step and determining whether or not, among the user IDs accessible to the selected destination folder, there is a user ID corresponding to attribute information that does not satisfy the selected open range condition;

an informing step of informing the user of a warning without storing the new file into the selected destination folder when said first determination step determines that among the user IDs accessible to the selected destination folder, there is at least one user ID corresponding to attribute information that does not satisfy the selected open range condition; and a storing step of storing the new file into the selected destination folder when the first determination step determines that, among the user IDs accessible to the selected destination folder, there is no user ID corresponding to attribute information that does not satisfy the selected open range condition.

5. The method according to claim 4, wherein the attribute information contains information on an organization to which the user belongs, and in the user storage step, information representing a hierarchical relationship of the organizations is further stored.

6. The method according to claim 4, further comprising:

a file storage step of storing the selected open range condition for the new file; and a second determination step of, when changing the user IDs held in the holding step in correspondence with each of the plurality of folders, determining, for each file, whether the attribute information corresponding to each of the user IDs after the change satisfies the open range condition stored in the file storage step, wherein in the informing step, when it is determined that the attribute information corresponding to each of the user IDs after the change does not satisfy the open range condition, the user is informed of a warning.

7. A non-transitory storage medium which stores a control program for causing a computer to implement an information processing method defined in claim 4.

8. The apparatus according to claim 1, wherein said selection unit further provides a display for selecting the new file, the destination folder and the open range condition, and prompts the user to select the new file, the destination folder and the open range condition via the display, wherein the display is configured so that the user can arbitrarily select the open range condition for accessing the new file regardless of the user IDs held by said holding unit in correspondence with the selected destination folder.

9. The method according to claim 4, wherein said selection step further provides a display for selecting the new file, the destination folder and the open range condition, and prompts the user to select the new file, the destination folder and the open range condition via the display, wherein the display is configured so that the user can arbitrarily select the open range condition for accessing the new file regardless of the user IDs held by said holding unit in correspondence with the selected destination folder.

10. The apparatus according to claim 1, wherein said informing unit informs the user of the warning when said first determination unit determines that at least one of the attribute information corresponding to the user IDs do not satisfy the open range condition selected by said selection unit, and further prompts the user to select whether the new file is stored into the destination folder or not.

11. The method according to claim 4, wherein said informing step informs the user of the warning when said first determination step determines that at least one of the attribute information corresponding to the user IDs do not satisfy the open range condition selected in said selection step, and further prompts the user to select whether the new file is stored into the destination folder or not.

* * * * *